United States Patent [19]

Heinz

[11] 4,420,987

[45] Dec. 20, 1983

[54] RECIRCULATING BALL DISC ACTUATOR

[75] Inventor: Theodore A. Heinz, Simi Valley, Calif.

[73] Assignee: Rockwell International Corporation, El Segundo, Calif.

[21] Appl. No.: 244,550

[22] Filed: Mar. 17, 1981

[51] Int. Cl.³ .................... F16H 25/18; F16H 25/22
[52] U.S. Cl. ........................................ 74/99 A; 74/56
[58] Field of Search ............... 74/99 R, 99 A, 216.3, 74/424.5, 424.7, 424.8 NA, 56; 173/123

[56] References Cited

U.S. PATENT DOCUMENTS

| | | | |
|---|---|---|---|
| 1,041,569 | 10/1912 | Bade | 173/123 |
| 2,942,580 | 6/1960 | Siravo | 74/99 A |
| 3,018,665 | 1/1962 | Christoff | 74/99 R |
| 3,148,552 | 9/1964 | Vandewege | 74/99 R |
| 3,280,921 | 10/1966 | Bickford | 173/123 |
| 4,060,314 | 11/1977 | Heinz | 248/487 |

OTHER PUBLICATIONS

Russell C. Ball, "Rotary to Linear Motion," *Product Engineering*, vol. 33, No. 7, pp. 68–73, Apr. 2, 1962.

Primary Examiner—Lawrence J. Staab
Attorney, Agent, or Firm—H. Fredrick Hamann; Harry B. Field

[57] ABSTRACT

A linear actuator in which a pair of relatively rotating thrust members have opposing surfaces on which are formed a plurality of concentric circular races in which a plurality of balls circulate. Each race is in the form of a helix over substantially the full circular length of the race with a step joining the ends of the helix. The steps in adjacent concentric races are spaced apart by 180°. Each race over half its length is recessed so that the balls engage the opposing races along approximately half the length of each race, the recessed half of adjacent concentric races being offset by 180° so that the thrust load is shared by substantially the same number of balls around the respective half-circular of the two sets of races.

12 Claims, 8 Drawing Figures

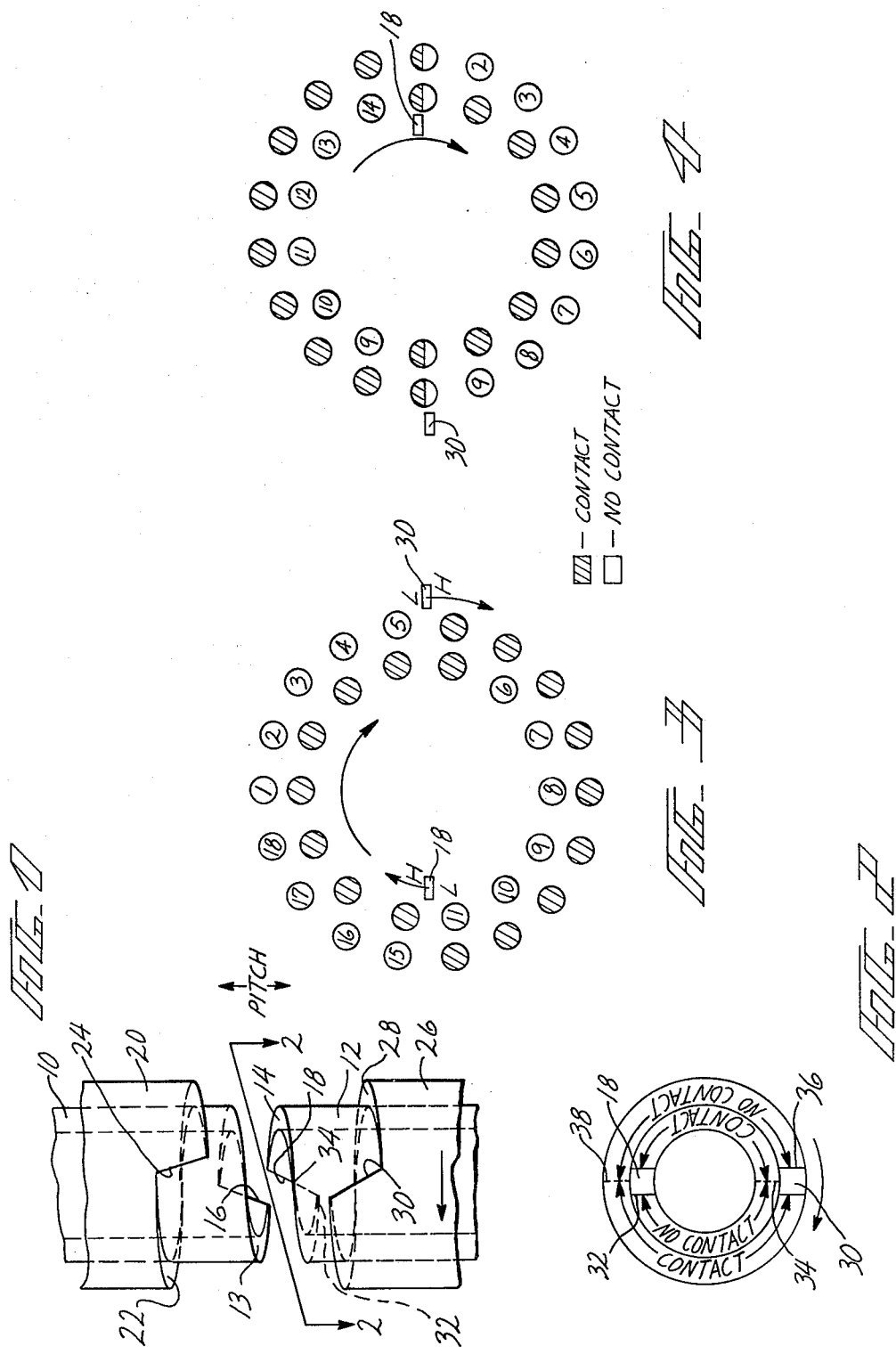

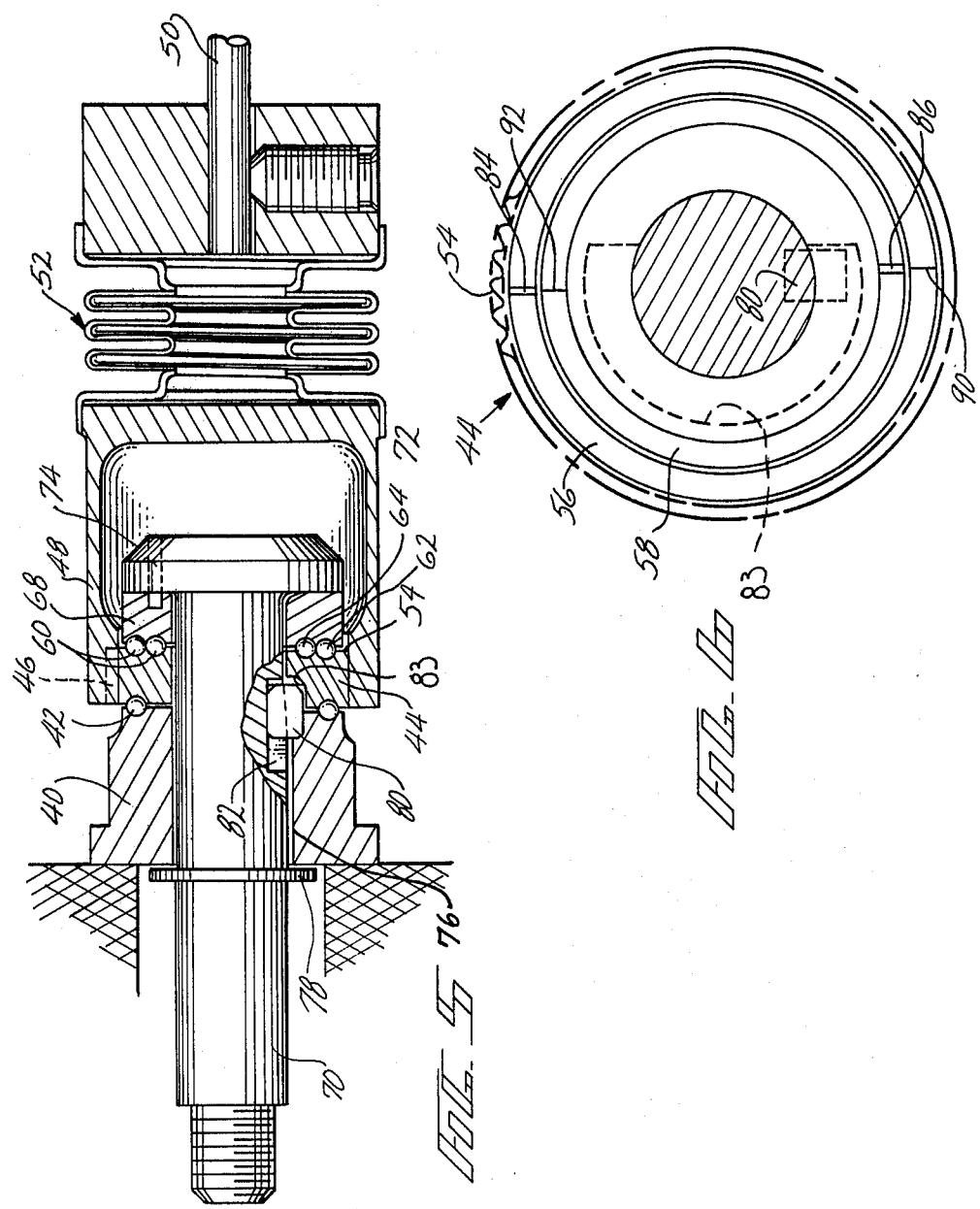

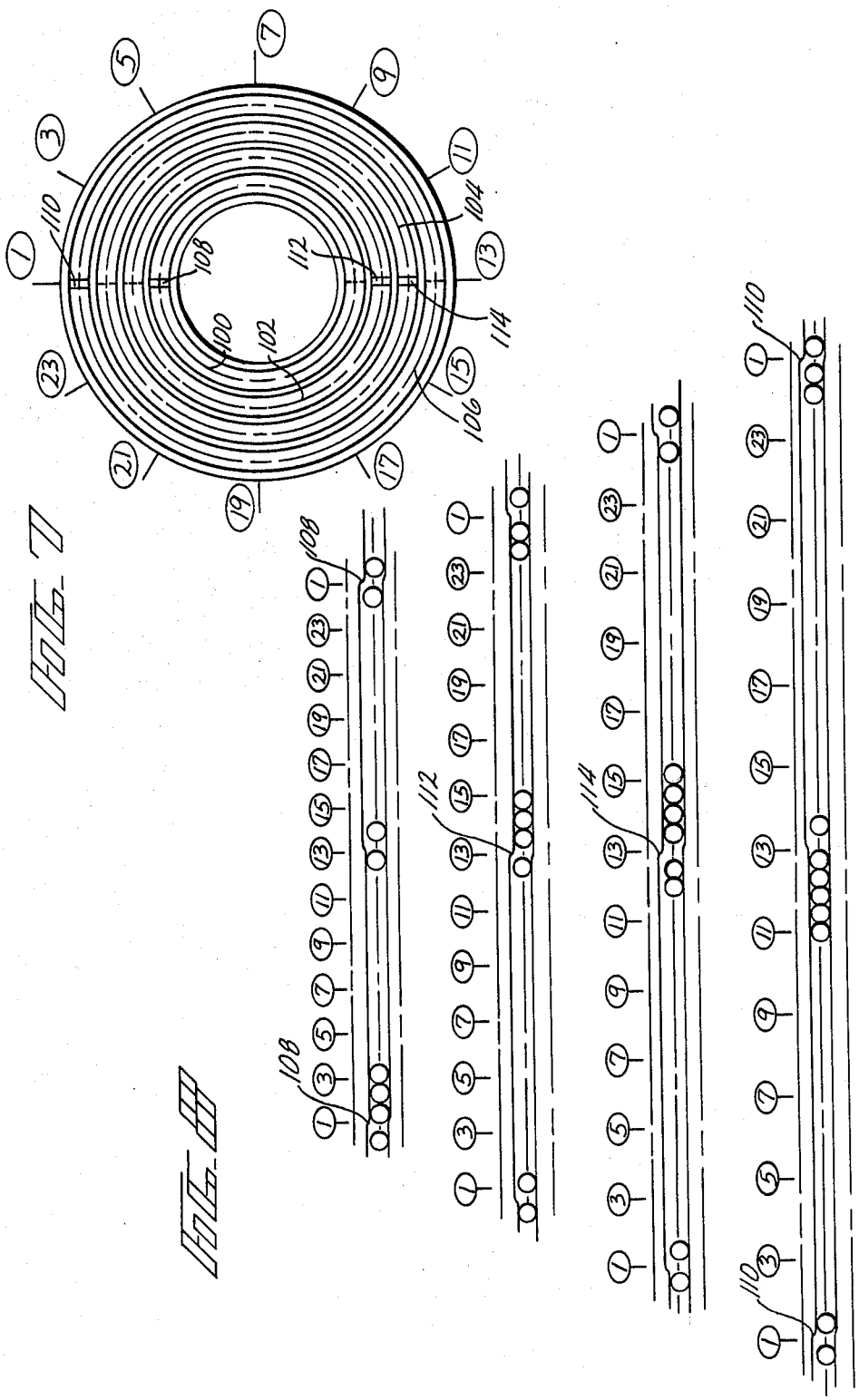

RECIRCULATING BALL DISC ACTUATOR

FIELD OF THE INVENTION

This invention relates to linear actuators, and more particularly, to a low friction recirculating ball type actuator.

BACKGROUND OF THE INVENTION

Linear actuators in which a screw thread is used to convert a rotary motion into a linear motion are well-known. In U.S. Pat. No. 4,060,314 assigned to the same assignee as the present invention, there is described a high precision low friction linear actuator used in positioning and adjusting the reflecting surface of a laser mirror. The linear actuator shown in the patent utilized a screw thread and nut arrangement in which tiny ball bearings circulated in the threads between the screw and the nut to provide rolling friction between the threads of the screw and the nut. This actuator device derived its resolution and stability from the fact that the load was evenly distributed over a large number of ball-race contacts, and a high initial deflection of the ball-race contacts was provided by preloading of the actuator. Linear actuators of the type described in the above-identified patent, while extremely effective in operation, have several drawbacks in their design. First, because of the recirculating ball arrangement, it is difficult to reduce the size of the actuator, thus limiting the number of actuators that can be positioned in a given space. Manufacturing limitations on nut-race contours, ball recirculating mechanisms and other critical dimensions restrict practical screw diameters to a half-inch or larger for actuators of high precision. Secondly, the screw and nut arrangement has a load vector which is at an angle to the axis of rotation of the screw. Thus the load produces both a linear component of thrust and a radial component. For a given level of thrust produced by the linear actuator, a greater load is therefore imposed on the balls and ball-races than would be required if the full load were transferred in a direction parallel to the direction of the thrust.

SUMMARY OF THE INVENTION

The present invention is directed to an improved linear actuator which produces very high resolution and stability but which is simpler in its design and easier and less costly to manufacture or produce. Moreover, the actuator of the present invention can be made smaller and more compact while achieving the same level of resolution, long term stability and thurst load as the ball-screw actuator described in the patent.

These and other advantages of the present invention are achieved by providing a linear actuator in which two discs from opposing substantially parallel surfaces. One of the discs is movable toward or away from the other disc to vary the spacing between the surfaces. One disc is rotated by a drive motor about an axis of revolution perpendicular to the opposing surfaces. Each surface has at least two circular grooves concentrically centered about the axis of revolution, the grooves forming ball-races. Balls circulate in the grooves between the two surfaces. The grooves in both discs are formed as one turn of a helix pitched in the direction of the axis of revolution. The ends of the helix are joined by a step in the groove. The positions of the steps in adjacent concentric grooves are positioned diametrically on either side of the axis of revolution. The grooves in at least one of the discs are recessed or undercut slightly over an arcuate length of 180° so that the balls along the recessed portion are unloaded. The arcuate positions of the recessed portions of the concentric grooves are offset by 180° so that the unloaded balls in adjacent grooves are on opposite halves of the disc. The total load is therefore shared by balls in each groove around the full perimeter of the discs.

BRIEF DESCRIPTION OF THE DRAWINGS

For a better understanding of the invention reference should be made to the accompanying drawings, wherein:

FIG. 1 is a simplified side view of an actuator embodying the principles of the present invention;

FIG. 2 is a sectional view taken substantially on the line 2—2 of FIG. 1;

FIGS. 3 and 4 illustrate the positions of the balls and the loading of the balls under different positions of of the actuator;

FIG. 5 is a cross-sectional view of a linear actuator;

FIGS. 6 and 7 are detailed views of the disc faces; and

FIG. 8 is an enlarged view showing the contour of the bottom of the grooves.

DETAILED DESCRIPTION

The basic concept of the invention can best be understood by reference to FIGS. 1-4, which show a schematic representation of the linear actuator. A pair of coaxial inner tubular members 10 and 12 have their opposing end surfaces 13 and 14 machined in the form of a single helical turn generated along the axis of revolution of the tubular members. Each helical turn is terminated in a step, as indicated at 16 and 18 respectively, which, as viewed in FIG. 1, are on the backside of the tubular members. The helical surfaces are inclined at an angle $\theta$ relative to a plane perpendicular to the axis of rotation of the tubular members. The angle $\theta$ is determined by the pitch of the helix and the diameter of the tube in the same manner as a conventional screw thread. It will be readily apparent that if the helical surfaces were brought in contact with each other and the lower tube 12 was rotated in the direction of the arrow relative to the upper tube 10, the relative movement between the inclined surfaces would cause the tubular member 12 to be moved axially relative to the tubular member 10 by the amount determined by the pitch and the angle of rotation. At the completion of one revolution, of course, the steps would allow the two tubular members to move abruptly together so that the maximum axial movement is limited to slightly less than the pitch of the single turn helix.

Instead of bringing the two helical surfaces into contact, circulating balls may be interjected between the two surfaces. The balls would then provide rolling friction rather than sliding friction but would not otherwise change the relative axial movement between the two tubular members in response to relative rotation between the two tubular members. However, to make a practical device which can absorb a substantial thrust load, it would be necessary to distribute balls around the full circumference of the helical gap between the two opposing surfaces 13 and 14. This would not be practical since the circulating balls would have to move past the steps. Furthermore, as the angular position of one step rotates relative to the step in the opposing surface, the length of the portion of the helix in which the balls are maintained in load-bearing contact with the opposing helical surface is reduced so that the number of balls transferring the thrust load decreases with rotation.

The present invention provides an arrangement by which the linear motion by relative rotation of the two tubular members is achieved while the thrust load remains evenly distributed on a fixed number of balls spaced around the full circumference. This is accomplished by providing two additional opposing helical surfaces which are concentric with the first set of opposing surfaces about the axis of rotation. However, the additional surfaces have their steps offset from steps of the first of opposing surfaces by 180°. Referring again to FIGS. 1 and 2, consider a second tubular member 20 concentric with the tubular member 10 and having a single turn helical surface 22 with a step 24 positioned diametrically opposite the position of the step 16. Also, consider a second tubular member 26 concentric with the tubular member 12 and having a single turn helical surface 28 with a step 30 which is diametrically opposite the step 18. In FIG. 1, the helical surfaces forming the ends of the tubular members 20 and 26 are shown axially offset for the sake of clarity. Assume, however, that the outer tubular members 20 and 26 are moved together along their common axis of rotation and separated only by balls interjected between the opposing helical surfaces 22 and 28. If the helical surface 14 is undercut slightly from one edge of the step 18, as indicated at 32, around to a point 34 diametrically opposite the step 18, the balls moving along this half sector will not be in load-bearing contact with the two opposing helical surfaces. Only the balls in contact with the right half sector will be in load contact, as indicated in FIG. 2. Similarly, if the surface 28 is undercut from the edge 36 of the step 30 around to a point 38 diametrically opposite the step 36, only balls on the left hand sector of the outer helical surface 28 will be in load-bearing contact with the opposing helical surface 22. However, because there are two concentric sets of helical surfaces, it will be seen that the load-bearing balls are in contact with one or the other of the two concentric sets of helical surfaces over substantially the full 360°, thus providing substantially uniform distribution of the load over a large number of balls around the complete circumference of the two thrust members formed by the tubes 10 and 20 and the tubes 12 and 26, respectively. Moreover, this balanced load distribution allows one thrust member to be rotated through 180° relative to the other thrust member while retaining the same total number of balls in load bearing contact and in the same 360° distribution.

This is shown schematically in FIGS. 3 and 4. FIG. 3 shows the distribution of the load-bearing balls and the unloaded balls at the start of the stroke when the steps in the opposing helical surfaces are substantially aligned. FIG. 4 shows the position of the balls relative to the steps 18 and 30 after the lower tubes 12 and 26 have been rotated through substantially 180° relative to the tubes 10 and 20. It will be noted that while the lower tubes rotate through 180° relative to the upper tubes shown in FIG. 1, the balls themselves, as they roll between the opposing surfaces, have their centers moved through approximately 90° around the axis of rotation.

One embodiment of a linear actuator using the concepts of the invention described above is shown in FIG. 5. A collar or mounting hub 40 forms the base of the linear actuator. One end of the hub 40 has a groove forming a race for a ball thrust bearing. A plurality of ball bearings 42 circulate in the race. The ball bearings 42 engage a mating groove forming a ball-race in a ring-shaped thrust member 44 having a splined outer surface 46 which engages a mating splined drive shaft 48. The splined shaft 48 is coupled to the drive shaft 50 of a motor or the like (not shown) through a flexible coupling 52.

Thrust member 44 has an annular surface 54 having a pair of concentric circular grooves 56 and 58. These concentric grooves form races for ball bearings, as indicated at 60. The balls also engage races formed by a pair of matching circular grooves 62 and 64 in the opposing annular surface 66 of a second thrust member 68. A linear actuator shaft 70 having a flanged head 72 is secured to the thrust member 68 by one or more pins 74. The actuator shaft 70 is guided for linear motion lengthwise of the axis of revolution of the shaft 70 by passing through a central opening 76 in the mounting hub 40. A retainer ring 78 retains the shaft 70 in position after assembly but permits limited movement of the linear actuator shaft. A key 80 engages a key slot 82 in the shaft 70 and also a key slot in the mounting hub 40, thus preventing rotation of the linear actuator shaft 70. The key also extends into an arcuate slot 83 in the thrust member 44. As best seen in FIG. 6, the arcuate slot extends for slightly over 180°, thereby limiting angular movement of the thrust member 44 by engagement of the ends of the arcuate slot 83 with the key 80.

According to the concept of the present invention, the bottoms of the grooves 56 and 58 and the matching grooves 62 and 64 each form a single turn helix about the axis of revolution of the thrust members 44 and 68 in the same manner as the helical surfaces described above in connection with FIGS. 1 and 2. As shown in FIG. 6, the helical groove 56 has a step 84 between the shallow end and the deeper end while the helical shape of the inner groove 58 forms a step 86. The step, of course, results from the abrupt change in the depth of the groove at the transition between one end and the other end of the single turn helix, the height of the step defining the pitch of the helix. In order to achieve smooth operation, a transition angle is machined in the groove at the step location which progressively loads or unloads the balls as they make the transition from one level to the other level. This transition is typical at each step location. Also, the grooves 56 and 58 are deepened slightly in relation to their nominal values as defined by the helix to provide relief from load-bearing contact with the balls 60 in the manner discussed above in connection with FIGS. 1 and 2. This relief extends in each groove in a clockwise direction from the step around to a point diametrically opposite the step, as indicated at 90 and 92, respectively, for the grooves 56 and 58. As a result, the balls positioned around one half the circumference of one of the grooves and around the other half of the circumference of the other grooves are all in load-bearing contact with the opposing grooves in the thrust member 68, in the manner described above in FIGS. 3 and 4. This condition applies through the full 180° rotation of the thrust member 44.

It will be seen that 180° rotation of the thrust member 44 causes the linear actuator shaft when under tension to move linearly relative to the hub 40 by a distance equal to half the pitch of the helical grooves. The thrust load is distributed around the full 360° of the grooves, half in one groove and half in the other groove. This uniform loading of a large number of balls around the full circumference of the thrust bearing results in very high resolution with long term stability under heavy loads. The actuator is particularly suited to laser mirror mounts of the type described in U.S. Pat. Nos. 4,060,314 and 4,060,315.

A modification of the actuator which utilizes four concentric helical grooves rather than the two described above is shown in FIGS. 7 and 8. The four groove arrangement is otherwise identical in construction and concept to that described above. The four groove arrangement may be considered as two pairs of grooves, an inner pair 100 and 102 and an outer pair 104 and 106. The inner pair are identical to the pair of helical grooves of the embodiment of FIG. 5. The outer two grooves have their step positions reversed. Thus the inner grooves 100 and the outer grooves 106 have their steps 108 and 110 at angular position 1 while the grooves 102 and 104 have their respective steps 112 and 114 at angular position 13, as shown in FIGS. 7 and 8.

FIG. 8 shows the opposing bearing races stretched out in linear form, the positions shown by the circled numbers corresponding to the angular positions of the grooves in FIG. 7. It will be seen that the load-bearing balls in the inner grooves extend between angular positions 1 and 13. The same is true for the outer grooves, while the two intermediate grooves have the load-bearing balls positioned between angular positions 13 and 1. The benefit of four grooves over two grooves is that not only are the number of load-bearing balls increased but the average radial distance of the load-bearing balls from the axis of revolution is the same around the full 360° extent of the races. Thus the load-bearing distribution is balanced both circumferentially and radially in the four groove configuration in contrast to the two groove configuration in which half the load-bearing balls are at a different radial distance relative to the axis of rotation from the other half of the load-bearing balls.

It is to be understood that what has been described is merely illustrative of the principles of the invention and that numerous arrangements in accordance with this invention may be devised by one skilled in the art without departing from the spirit and scope thereof.

What is claimed is:

1. A linear actuator for moving a load along an axis comprising first and second thrust members journaled for relative rotation about said axis and movable relative to each other along said axis, the thrust members having opposing surfaces substantially transverse to said axis, each of said surfaces having at least one pair of concentric grooves forming circular ball-races coaxial with said axes, each race lying directly opposite a mating race on the opposing surface, a plurality of balls positioned between the opposing surfaces and spaced around the circumferences of the pairs of mating races, at least some of the balls engaging mating races on the opposing surfaces when the thrust members are urged toward each other along said axis, the bottom of the grooves forming the mating races being formed as an axially extending helix around substantially their full circumference with the ends of the helix being joined by a step, and means for rotating one thrust member relative to the other thrust member.

2. The apparatus of claim 1 wherein the steps in the respective concentric races are angularly offset from each other.

3. The apparatus of claim 2 in which the offset angle is approximately 180°.

4. The apparatus of claim 1 wherein the bottom of the groove forming at least one of the respective mating races is recessed slightly over a portion of the length of the groove to increase the space between the thrust members in which the balls move along the mating races.

5. Apparatus of claim 4 wherein a recess extends from the step approximately half way around the circumference of the respective races.

6. Apparatus of claim 1 wherein each thrust member includes two pairs of concentric races.

7. Apparatus of claim 5 wherein each thrust member includes two pairs of concentric races.

8. A linear actuator for moving a load along an axis comprising first and second thrust members journaled for relative rotation about said axis and movable relative to each other along said axis, the thrust members having opposing surfaces substantially transverse to said axis, each of said surfaces having at least one pair of concentric grooves forming circular ball-races coaxial with said axis, each race lying directly opposite a mating race on the opposing surface, a plurality of balls positioned between the opposing surfaces and spaced around the circumferences of the pairs of mating races, at least some of the balls engaging mating races on the opposing surfaces when the thrust members are urged toward each other along said axis, each of the grooves changing in depth at a substantially uniform slope around the circumference of the groove and forming a step where the deep end and the shallow end of the groove come together, the slopes being the same in all the grooves, and means for rotating one thrust member relative to the other thrust member.

9. The apparatus of claim 8 wherein the steps in the respective concentric races are angularly offset from each other.

10. The apparatus of claim 9 in which the offset angle is approximately 180°.

11. The apparatus of claim 8 wherein the bottoms of the grooves in one of the thrust members are deepened slightly over half their circumference while retaining the same slope.

12. The apparatus of claim 11 wherein the deepened sections in both grooves commence at the steps and extend in the same angular direction about the axis of revolution of the thrust members.

* * * * *